US008578465B2

(12) United States Patent
Xiao et al.

(10) Patent No.: US 8,578,465 B2
(45) Date of Patent: Nov. 5, 2013

(54) TOKEN-BASED CONTROL OF PERMITTED SUB-SESSIONS FOR ONLINE COLLABORATIVE COMPUTING SESSIONS

(75) Inventors: Sihai Xiao, Fremont, CA (US); Zheng Yuan, San Jose, CA (US); David Knight, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 12/506,321

(22) Filed: Jul. 21, 2009

(65) Prior Publication Data

US 2011/0023096 A1 Jan. 27, 2011

(51) Int. Cl.
*G06F 21/00* (2013.01)

(52) U.S. Cl.
USPC ........ 726/10; 726/5; 726/9; 726/11; 709/204; 709/223; 709/224; 709/229

(58) Field of Classification Search
USPC ............. 726/5, 9–11; 709/204, 223, 224, 229
See application file for complete search history.

(56) References Cited

U.S. PATENT DOCUMENTS

| | | | |
|---|---|---|---|
| 6,038,322 A | 3/2000 | Harkins | |
| 6,215,878 B1 | 4/2001 | Harkins | |
| 6,374,294 B1 * | 4/2002 | Quirt | 709/221 |
| 6,718,390 B1 | 4/2004 | Still et al. | |
| 6,741,705 B1 | 5/2004 | Nelson et al. | |
| 6,742,126 B1 | 5/2004 | Mann et al. | |
| 6,775,783 B1 | 8/2004 | Trostle | |
| 7,010,600 B1 | 3/2006 | Prasad et al. | |
| 7,016,964 B1 | 3/2006 | Still et al. | |
| 7,028,073 B1 | 4/2006 | Bui et al. | |
| 7,062,658 B1 | 6/2006 | Cheriton et al. | |
| 7,072,354 B1 | 7/2006 | Beathard | |
| 7,162,628 B2 | 1/2007 | Gentil et al. | |
| 7,171,491 B1 | 1/2007 | O'Toole et al. | |
| 7,171,555 B1 | 1/2007 | Salowey et al. | |
| 7,174,569 B1 | 2/2007 | Trostle | |
| 7,181,620 B1 | 2/2007 | Hur | |
| 7,187,681 B1 | 3/2007 | O'Toole, Jr. et al. | |
| 7,194,763 B2 | 3/2007 | Potter et al. | |
| 7,216,176 B1 | 5/2007 | Still et al. | |
| 7,224,775 B1 | 5/2007 | Shaffer et al. | |
| 7,234,058 B1 | 6/2007 | Baugher et al. | |
| 7,234,063 B1 | 6/2007 | Baugher et al. | |
| 7,249,374 B1 | 7/2007 | Lear et al. | |
| 7,287,692 B1 | 10/2007 | Patel et al. | |
| 7,334,119 B2 | 2/2008 | Gentil et al. | |
| 7,334,125 B1 | 2/2008 | Pellacuru | |
| 7,356,063 B2 | 4/2008 | Katsuyama et al. | |
| 7,412,392 B1 * | 8/2008 | Satapathy | 704/270.1 |
| 7,421,503 B1 | 9/2008 | Stieglitz et al. | |
| 7,437,558 B2 | 10/2008 | Fenton et al. | |
| 7,450,568 B2 | 11/2008 | Shim et al. | |

(Continued)

*Primary Examiner* — Kambiz Zand
*Assistant Examiner* — Tongoc Tran

(57) ABSTRACT

In one embodiment, a client device may send one or more sub-session requests to one or more corresponding session controllers through a computer network to obtain one or more corresponding sub-session tokens that indicate in which sub-sessions of an online collaborative computing session the client device is permitted to participate. The client device may then receive particular sub-session tokens (e.g., based on certain permissions), which may then be sent to a collaboration server to establish one or more permitted sub-sessions of the online collaborative computing session with the client device as indicated by the received sub-session tokens.

17 Claims, 8 Drawing Sheets

(56) References Cited

U.S. PATENT DOCUMENTS

| | | |
|---|---|---|
| 7,469,294 B1 | 12/2008 | Luo et al. |
| 7,472,191 B2 | 12/2008 | Stewart et al. |
| 7,472,411 B2 | 12/2008 | Wing et al. |
| 7,496,346 B2 | 2/2009 | Oswal et al. |
| 7,506,358 B1 | 3/2009 | Fry et al. |
| 7,508,941 B1 | 3/2009 | O'Toole, Jr. et al. |
| 7,512,970 B2 | 3/2009 | Naftali et al. |
| 7,516,184 B2 | 4/2009 | Thomas |
| 7,519,077 B2 | 4/2009 | Beathard |
| 7,523,859 B2 | 4/2009 | Patel et al. |
| 7,533,258 B2 | 5/2009 | Baugher |
| 7,536,187 B2 | 5/2009 | Oswal et al. |
| 7,555,783 B2 | 6/2009 | Enright |
| 7,835,510 B2 * | 11/2010 | Akachi ............... 379/202.01 |
| 8,082,351 B1 * | 12/2011 | Kelley et al. ............... 709/227 |
| 2002/0138582 A1 * | 9/2002 | Chandra et al. ............... 709/206 |
| 2004/0221032 A1 | 11/2004 | Bernstein et al. |
| 2005/0120213 A1 | 6/2005 | Winget et al. |
| 2005/0213563 A1 | 9/2005 | Shaffer et al. |
| 2006/0062367 A1 | 3/2006 | Christenson et al. |
| 2006/0095772 A1 | 5/2006 | Bell et al. |
| 2006/0171537 A1 | 8/2006 | Enright |
| 2006/0174106 A1 | 8/2006 | Bell et al. |
| 2006/0215557 A1 | 9/2006 | Corley et al. |
| 2006/0218632 A1 | 9/2006 | Corley et al. |
| 2006/0221925 A1 | 10/2006 | Beathard |
| 2006/0233135 A1 | 10/2006 | Oswal et al. |
| 2006/0239235 A1 | 10/2006 | Oswal et al. |
| 2006/0242701 A1 | 10/2006 | Black et al. |
| 2006/0256950 A1 | 11/2006 | Patel et al. |
| 2006/0268856 A1 | 11/2006 | Voit et al. |
| 2007/0078986 A1 | 4/2007 | Ethier et al. |
| 2007/0100986 A1 * | 5/2007 | Bagley et al. ............... 709/224 |
| 2007/0101414 A1 | 5/2007 | Wing et al. |
| 2007/0112683 A1 | 5/2007 | Gleichauf |
| 2007/0136461 A1 | 6/2007 | Donovan et al. |
| 2007/0171834 A1 | 7/2007 | Sathyanarayana et al. |
| 2007/0192842 A1 | 8/2007 | Beaulieu et al. |
| 2007/0202907 A1 | 8/2007 | Shaffer et al. |
| 2007/0220589 A1 | 9/2007 | Salowey et al. |
| 2007/0220598 A1 | 9/2007 | Salowey et al. |
| 2007/0226775 A1 | 9/2007 | Andreasen et al. |
| 2007/0245137 A1 | 10/2007 | Bhagat et al. |
| 2007/0256120 A1 | 11/2007 | Shatzkamer et al. |
| 2007/0268837 A1 | 11/2007 | Melton et al. |
| 2007/0268888 A1 | 11/2007 | Shatzkamer et al. |
| 2008/0011823 A1 | 1/2008 | Patel et al. |
| 2008/0022392 A1 | 1/2008 | Karpati et al. |
| 2008/0028437 A1 | 1/2008 | Zheng |
| 2008/0034207 A1 | 2/2008 | Cam-Winget et al. |
| 2008/0086634 A1 | 4/2008 | Salowey et al. |
| 2008/0120371 A1 * | 5/2008 | Gopal ............... 709/204 |
| 2008/0126541 A1 | 5/2008 | Rosenberg et al. |
| 2008/0133761 A1 | 6/2008 | Polk |
| 2008/0146192 A1 | 6/2008 | Kumarasamy et al. |
| 2008/0267094 A1 * | 10/2008 | Karniely et al. ............... 370/260 |
| 2009/0077176 A1 * | 3/2009 | Shae et al. ............... 709/204 |
| 2010/0175119 A1 * | 7/2010 | Vitaletti ............... 726/9 |

* cited by examiner

TOKEN-BASED CONTROL OF PERMITTED SUB-SESSIONS FOR ONLINE COLLABORATIVE COMPUTING SESSIONS

TECHNICAL FIELD

The present disclosure relates generally to computer networks, and, more particularly, to online collaborative computing sessions.

BACKGROUND

Online collaborative computing sessions, such as interactive conferences (e.g., web conferences/meetings), may be supported by a computer network having servers distributing content between participating client computers. In particular, the content may be distributed based on one or more sub-sessions, such as a desktop sharing session, chat session, video session, etc. Attendees to an online collaboration session may generally log in to the session regardless of their location, so long as they have a link to the session and proper authentication (e.g., a session ID, password, etc.). It may be difficult to enforce policies for attendees when they may log in from any location.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a client device may send one or more sub-session requests to one or more corresponding session controllers through a computer network to obtain one or more corresponding sub-session tokens that indicate in which sub-sessions of an online collaborative computing session the client device is permitted to participate. The client device may then receive particular sub-session tokens (e.g., based on permissions, e.g., firewall restrictions on the particular network locations to deny sub-session types, or internal versus guest association with the online collaborative computing session), which may then be sent to a collaboration server to establish one or more permitted sub-sessions of the online collaborative computing session with the client device as indicated by the received sub-session tokens.

Description

Architecture for Collaborative Computing Sessions

Figure 1:
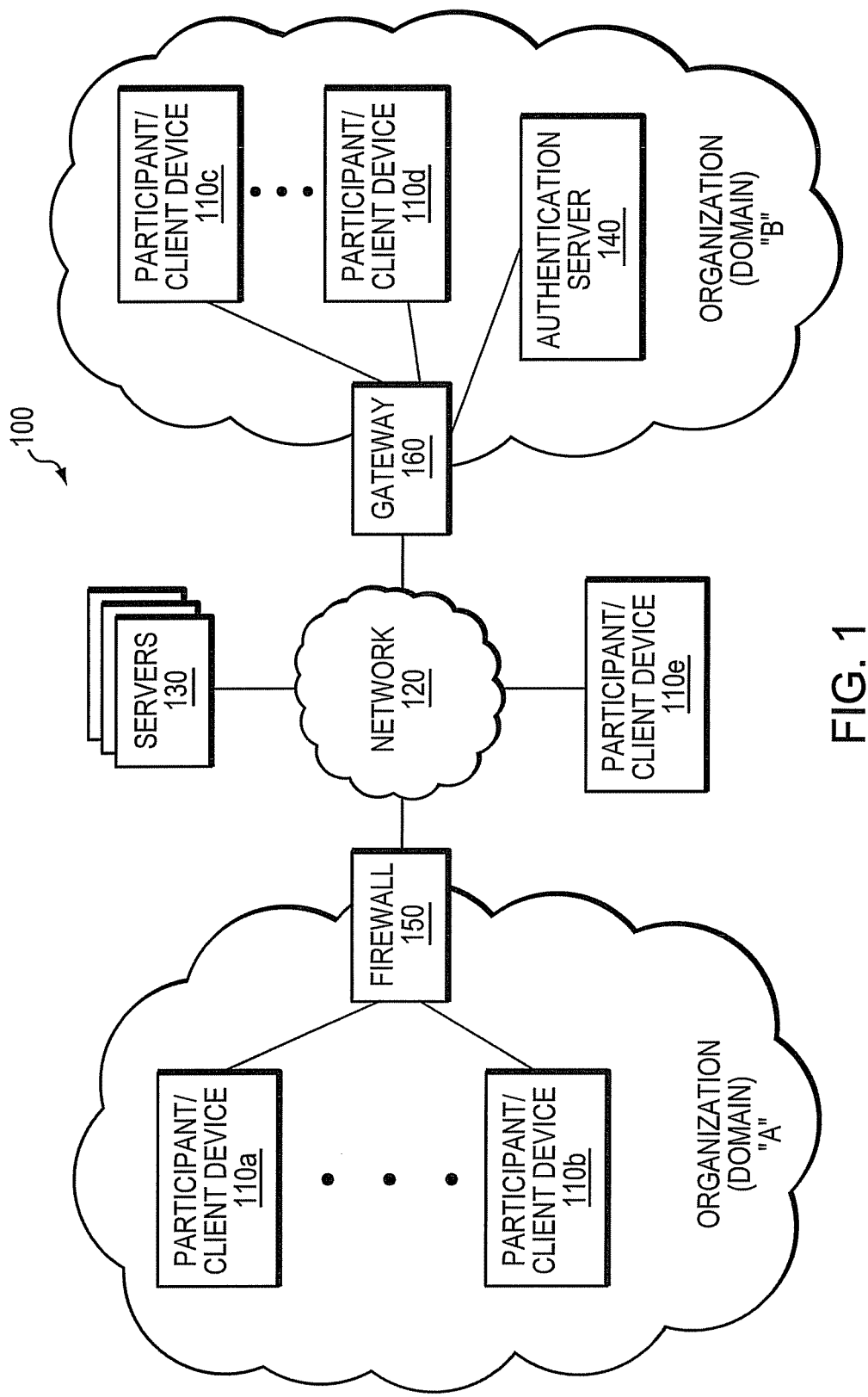
FIG. 1 illustrates an example computer network.

FIG. 1 is a schematic block diagram of an example computer network 100 illustratively comprising nodes/devices, such as one or more participant/client devices 110 and one or more interaction servers 130 interconnected by links/network 120 as shown and as described further herein. For instance, participant devices, as described below, may be a personal computer (PC) or one or more peripheral devices, such as phones, pagers, etc. Also, as described herein, client devices 110*a* and 110*b* may belong to a particular controlled domain, such as organization (or company) "A" (illustratively behind a firewall 150), while client devices 110*c* and 110*d* may belong to another controlled domain "B" (illustratively behind a gateway 160 and having servers 140). Client device 110*e* belongs to neither organization A nor B. Those skilled in the art will understand that any number of nodes, devices, links, etc. may be used in the computer network, and that the view shown herein is for simplicity.

In this environment, a number of participants may interact in an online, interactive, or collaborative setting. Such a setting can be for a meeting, training or education, support, or any other event that may require a number of participants to work together, interact, collaborate, or otherwise participate, such as web conferences, online meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 110 through the interaction server 130. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

In particular, each participant (e.g., hosts/presenters and/or attendees) may operate a participant device 110. Each participant device (or client device, herein) 110 may comprise an electronic device with capability for visual and/or auditory presentation.

Thus, a participant device 110 can be, for example, a desktop personal computer (PC), a laptop computer, a workstation, a personal digital assistant (PDA), a wireless telephone, a smart phone, an Internet television, and the like. Each participant device 110 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 130 such as, for example, the Internet, and may appear as a client computer thereon.

In one embodiment, each participant device 110 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the online, interactive meeting (a collaborative computing session), such as conventional web browser programs that allow convenient access and navigation of the Internet (e.g., the World Wide Web).

The online meeting (collaborative computing session) of the various participants may be supported by an interaction server 130 which may be maintained or operated by one or more of the participants and/or a third-party service provider. The interaction server 130 may be a computer system that is connected to network 120, and which may comprise and appear as one or more server computers thereon. Interaction server 130 may store information (e.g., content) and application modules which can be provided to the participant devices 110. In some embodiments, these application modules are downloadable to the participant devices 110 and may support various functions that may be required for an interactive meeting or collaborative effort among the participants. The participant devices 110 and the interaction server 130 may interact in a client/server architecture, which may provide high performance and security for a multi-participant collaborative environment.

Network 120 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
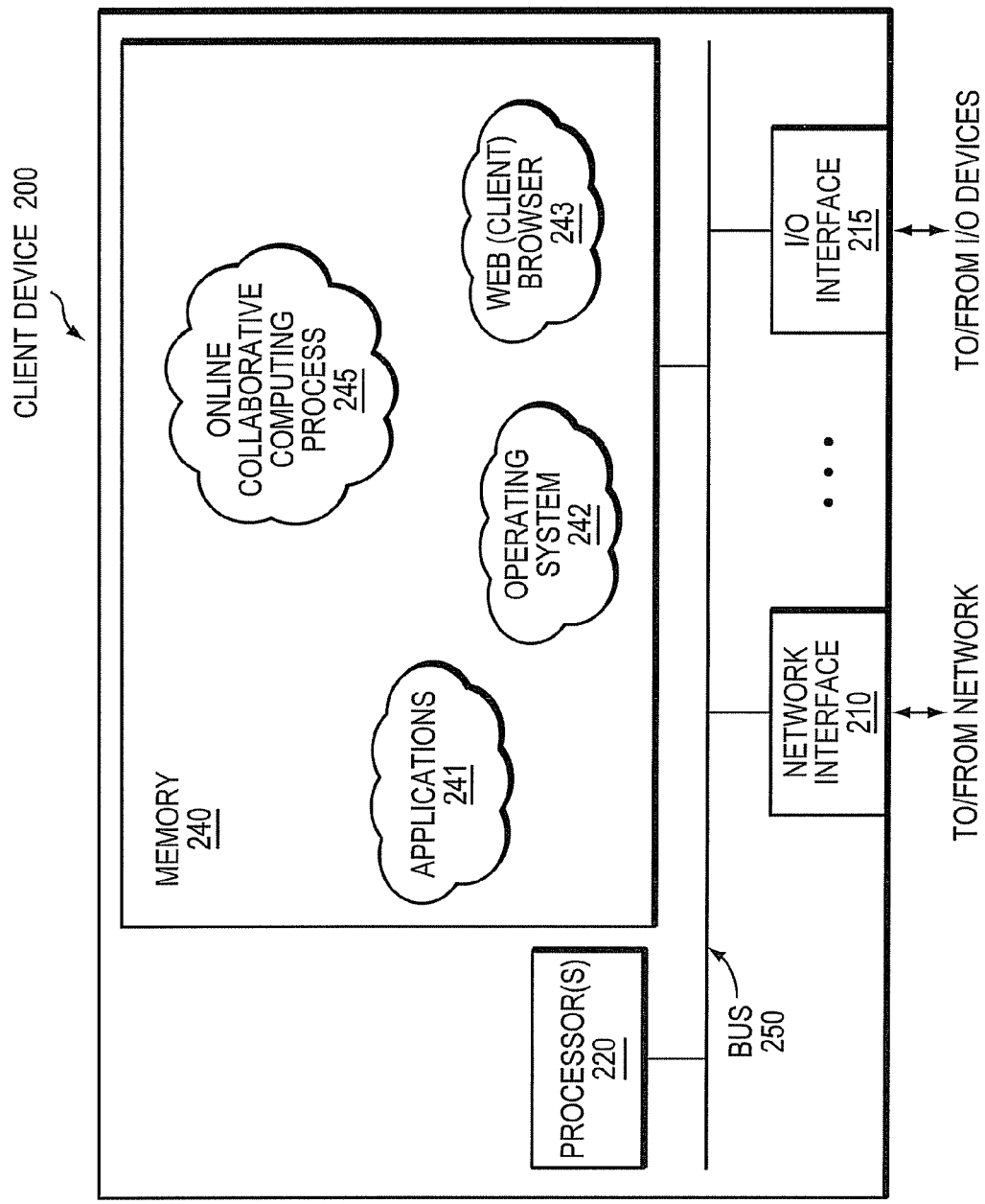
FIG. 2 illustrates an example device/node.

FIG. 2 illustrates a schematic block diagram of an example participant/client device 200 that may be advantageously used with one or more embodiments described herein, e.g., for collaborative computing as participant/client devices 110 (hereinafter device 200 or 110). Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 120. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. A portion of the memory may (though need not) be arranged as a cache (not shown) configured to store one or more data structures and/or code modules associated with embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise one or more applications 241 (e.g., web browser 243) as understood by those skilled in the art, and, in particular, an online collaborative computing process 245, as described herein. It will be apparent to those skilled in the art that other types of processors and memory, including various computer-readable media, may be used to store and execute program instructions pertaining to the inventive technique described herein.

The online collaborative computing process 245 may contain computer executable instructions executed by the processors 220 to generally perform functions to manage or control various processes or aspects during the course of an online meeting or collaborative computing session in which the participant (user) may interact with other users. For instance, an activity manager may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

Also, a communications component of process 245 may support communication between system 200 and an outside network 120 (e.g., the Internet), such as through network interfaces 210. The communications component thus allows data and information to be exchanged with or retrieved from other systems or facilities (e.g., participant devices 200/110 or interaction server 130), for example, during an online meeting or other collaborative computing session. In particular, the communications component may provide a communication platform for any one or more process instances of process 245. For instance, the activity manager may rely on the communications component to establish and maintain the client connection to the interaction server 130 on which the activity session is hosted. Any application code modules (not shown) may also use the established client connection to provide real-time data that is sent and received by each participant.

Various functionality for supporting a collaborative computing session, such as an online meeting, may be provided by the one or more application code modules, generally described herein as being components of the online collaborative computing process 245. These application code modules may be stored/maintained (e.g., by a cache), and may support, for example, basic communication framework, file sharing (e.g., for text, images, video, audio), remote access, user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VOIP) module, a question-answer (QA) module, a file transfer module, a presentation module, an application/desktop view/share module, and an Internet telephony module.

Figure 3:
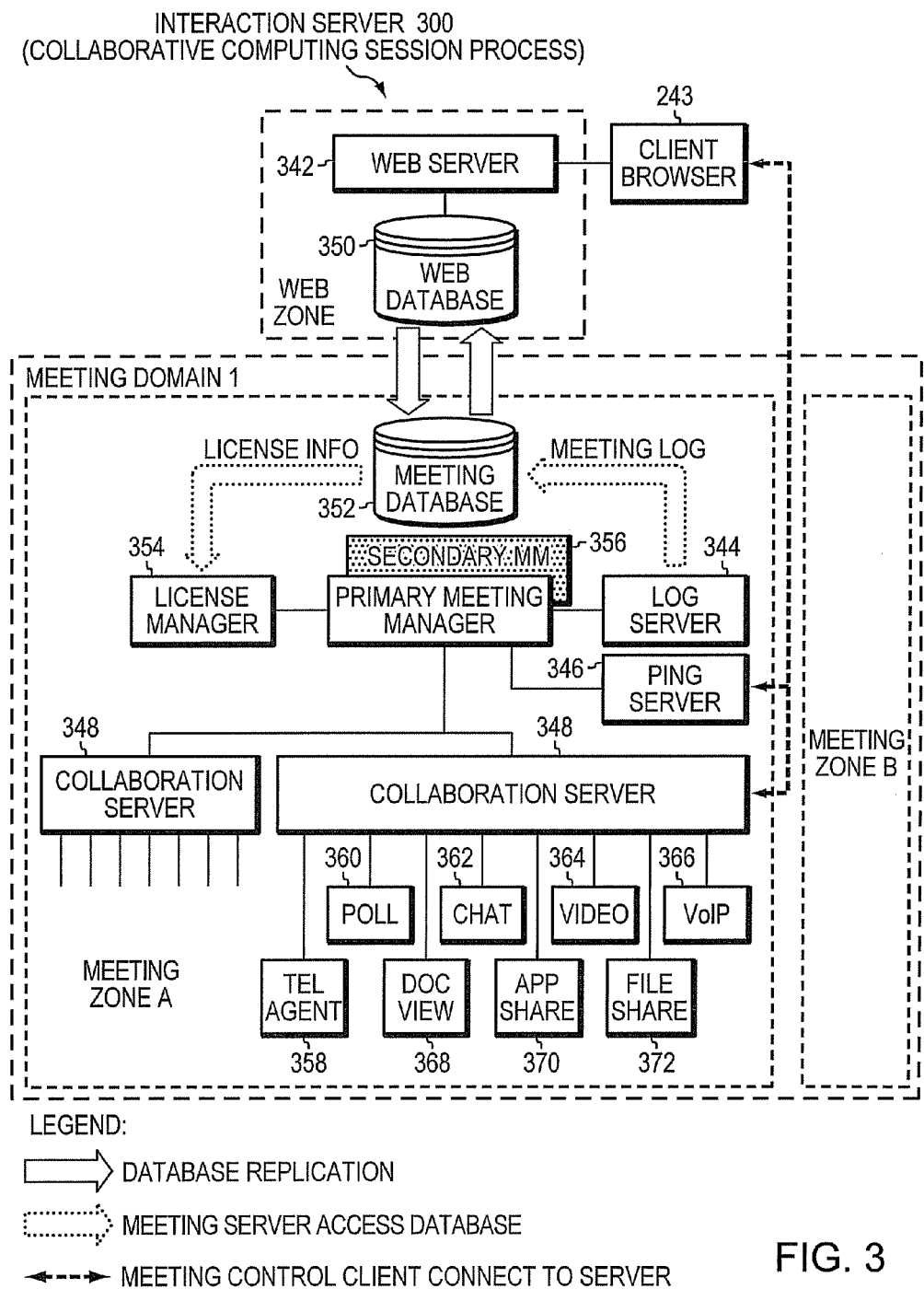
FIG. 3 illustrates an example server arrangement.

FIG. 3 illustrates an example implementation for a computer system 300 that may operate as interaction server 130 according to one or more embodiments described herein (hereinafter referred to as interaction server 300 or 130). Illustratively, in the computer system environment as shown, a number of server computers and databases may be in communication to provide for collaborative meeting or computing. As such, the interaction server 300 and its various components may also be referred to as a collaborative computing process 300. Notably, while the illustrative embodiment described below shows a collection of servers (e.g., localized and/or distributed), a single server may also operate to perform the functions described herein (e.g., collaborative computing process 300). Thus, "interaction server 300" may comprise, either as a single server or as a collection of servers, one or more memories, one or more processors, one or more network interfaces (e.g., adapted to communicate traffic for a collaborative computing session and also traffic on a communication channel other than the collaborative computing session), etc., as may be appreciated by those skilled in the art.

In particular, referring to the environment shown in FIG. 3, a number of processing facilities, including, for example, one or more of a web server 342, a log server 344, a ping server 346, a collaboration server 348, license manager 354, primary and secondary meeting managers 356, application servers (e.g. telephone agent 358, poll 360, chat 362, video 364, voice over IP 366, document view 368, application share 370, and file share 372) may be integrated with a number of data storage facilities, such as, for example, a web database 350 and a meeting database 352 to implement a system for collaborative meetings over the Internet (e.g., for collaborative computing session "process" 300). As depicted, the processing and database facilities of this environment ("process" 300) may be divided into a web zone and one or more meeting zones for interaction with one or more client browsers (which may operate on respective participant devices 200).

A web zone may comprise one or more server machines that share a common web database 350. In the web zone, web server 342 may have a unique IP address (which may be associated with a particular website) and may respond to, e.g., Hyper-Text Transport Protocol (HTTP) requests coming to that IP address from client browser 243. Web server 342 serves or supports web pages, while web database 350 may contain static information for the website including site specific data, web pages, and user data.

Illustratively, a meeting zone is a collection of servers and databases that help perform synchronous activity of an online collaborative meeting. In a meeting zone, the meeting managers 356 may be servers which communicate with other servers in the meeting zone (e.g., collaboration server 348, log server 344, ping server 346, etc.) to keep track of the online meetings in progress in the meeting zone. Meeting managers 356 may log meeting information into meeting database 352. Ping server 346 works with meeting managers 356 to determine a collaboration server 348 that is most suitable for hosting a particular meeting; it may act as a load balancer for the meeting service. Collaboration servers 348 may handle all real time control and communication during an online collaborative meeting. The application servers (e.g., servers 358 through 372) may support specific features that may be available as part of an online collaborative meeting, such as, for example, telephony, polling, chatting, video, voice over IP, document review, application sharing, and file sharing (e.g., "sub-sessions"). Also, license manager 354 may keep track of and enforce licensing conditions and charges for the meeting. Further, the log server 344 may keep track of meeting logs, and meeting database 352 may maintain at least a portion of the transient data required to conduct and keep track of online meetings. This data may include, for example, site and user information that would be required to establish and conduct a meeting.

In addition, according to one or more embodiments described herein, an online collaborative computing session may comprise one or more "sub-sessions," such as a different sub-session for various components or features of the session itself. For instance, these sub-sessions may comprise, e.g., voice, data, desktop sharing, document sharing (portable document), video, chat, file transfer, remote access, etc. Collaboration between participants may thus be achieved with one or more of the above sub-sessions enabled. For example, if a chat sub-session is enabled then an attendee can send a chat message to one or more other attendees while with desktop sharing sub-session enabled the presenter can share his/her desktop with all attendees, etc.

As described in detail above, online collaboration services allow people (users) to collaborate over the Internet, e.g., through a web browser, a standalone client application, etc. Users from different geographical locations and organizations (with or without accounts or affiliation with the online collaboration service providers) can share documents or desktops, control remote computers, and transfer files during a session (e.g., a meeting). While this provides tremendous flexibility and convenience for communication, it also raises security concerns from organizations, such as due to privacy and IP (Intellectual Property) concerns. For instance, attendees to an online collaboration session may generally log in to the session regardless of their location, so long as they have a link to the session and proper authentication (e.g., a session ID, password, etc.).

For attendees logging in from within an organization/company, there is currently no mechanism available to enforce policies of that company in the session, since the session service provider is generally unaware of the location of the attendees. For example, the company may wish to prevent desktop sharing or chat sessions during collaboration sessions (e.g., for security reasons). Further, for attendees logging in from within a company that has an account with the collaboration service provider, this is company may wish to enforce policies on the session based on whether another participant is internal to the company or a guest (e.g., no document sharing with clients outside of the company). However, there is currently no mechanism available to enforce such policies, since the session service provider is unaware of the location of the attendees. Conversely, in certain circumstances, the service provider may not have the company's policies, such as where the company is not a customer of (does not have an account with) the service provider. In this case, even if it had the location information, the service provider cannot enforce unknown policies.

Token-Based Control of Sub-Session Permissions

Conceptually, an online collaborative computing session consists of a collection of sub-sessions that are managed and operated by the service provider's collaboration server/process 300. According to one or more embodiments of the disclosure, policies relating to permitted or restricted (denied) sub-sessions may be enforced through the use of sub-session tickets or "tokens," which may be obtained from a corresponding session controller (server) located at a particular network location (e.g., a particular designated URL). The service provider's servers may then make access control decisions based on the token that carries the participant's privilege or "permissions" regarding sub-sessions in which the corresponding client device is entitled to participate (e.g., start or join). Certain sub-sessions can also be blocked by blocking the corresponding sub-session URL through a firewall, such that organizations without an account/affiliation with the service provider may enforce its policies.

In general, there are two types of policies that may be desired by a typical security-conscious company: internal and external. An internal policy, for example, may be defined by an organization to allow certain sub-sessions to be enabled either between internal employees (client devices under the control or management of the organization) or for the entire meeting when the meeting is hosted by the organization. This also includes the scenario where certain sub-sessions must be disallowed between internal and external participants (client devices not under the control or management of the organization). For example, chat and file transfer may be allowed between internal participants, while desktop sharing is not allowed between internal and external participants. External policies, on the other hand, may be defined by an organization to restrict certain sub-sessions and access, such as desktop sharing and file transfer for its employees when the meeting is hosted by a guest site (a different organization). External policies such as this are also useful even for companies who are not customers of the session service provider because they may still need to join such sessions.

Figure 4:
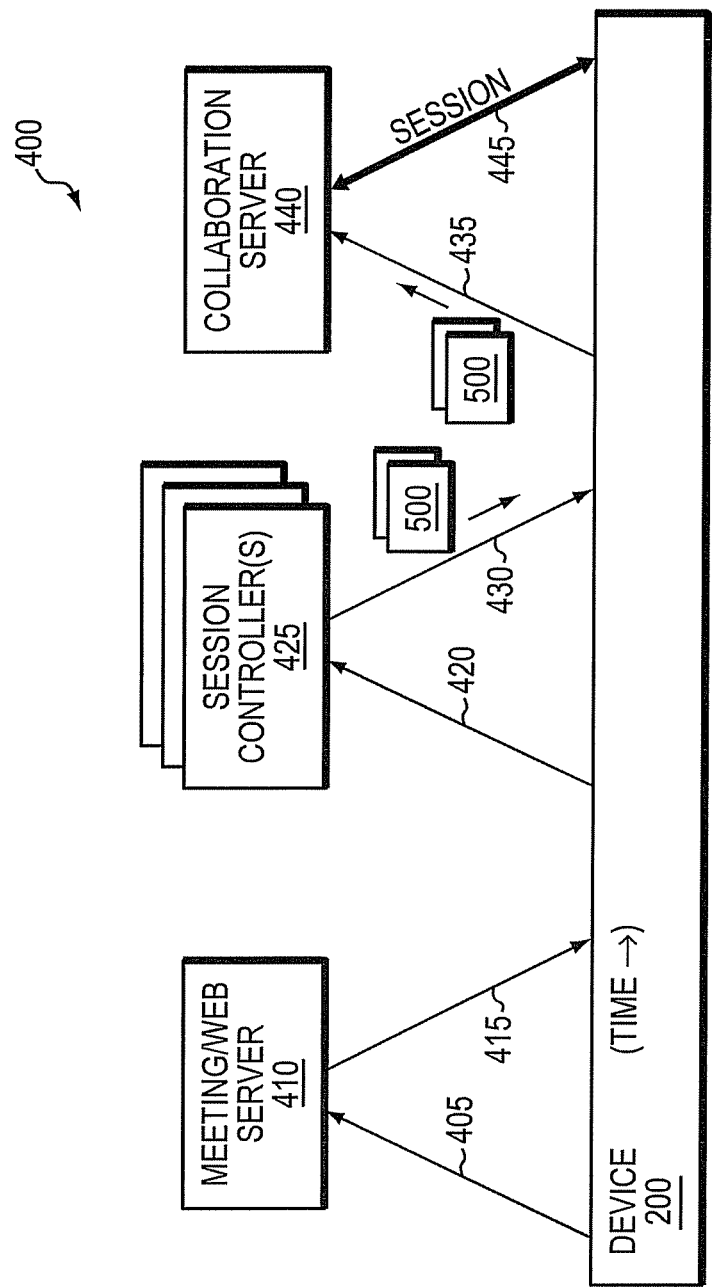
FIG. 4 illustrates an example token exchange between devices of the network.

Operationally, FIG. 4 illustrates an example of the general concept of the embodiments described herein, particularly illustrating an alternative (e.g., logical) view of the network and devices/servers described above. For instance, interaction server 300 from FIG. 3 may be illustratively viewed herein as a meeting/web server 410, one or more session controllers 425, and a collaboration server 440, each illustratively part of a service provider's data center and interconnected with a client device 200.

According to one or more embodiments herein, to establish an online collaborative computing session and its corresponding sub-sessions, the client device 200 (e.g., on behalf of a user) may first connect to the meeting/web server 410 by sending an initiating request 405, which, as described further below, may be a request to start a session or join a session as an internal or external attendee (e.g., from a meeting website). For example, hosts or attendees may be required to supply a username, meeting identification (ID), and/or password to start or join a session (e.g., meeting). The meeting server 410 may return a message 415 having a unique user ID for this meeting, possibly among other parameters as described below, such as a list of available sub-sessions for the session, and/or the location of various session controllers 425.

To start or join a session, the client device connects to the one or more session controllers by sending one or more sub-session requests 420 to the server(s) 425, e.g., along with user ID, in order to request sub-session tokens before starting/joining a particular sub-session. That is, the sub-session tokens indicate (in a manner described below) in which sub-sessions of an online collaborative computing session the client device is permitted to participate. In return, the session controller(s) 425 may return particular sub-session tokens in message 430 to the client device 200 based on sub-session permissions as described in detail herein. Accordingly, the received sub-session tokens may be sent (435) from the client device 200 to a collaboration server 440 to connect with the server 440 such that the corresponding permitted sub-sessions 445 of the session may be established (started/joined). (Note that where the client device does not obtain a token, it stops, e.g., and returns an error to the user.) In particular, the collaboration server 440 may validate the token and perform corresponding action based on the validation result (e.g., confirms the token and associated user or meeting IDs, and establishes or rejects the sub-sessions accordingly.)

Figure 5:
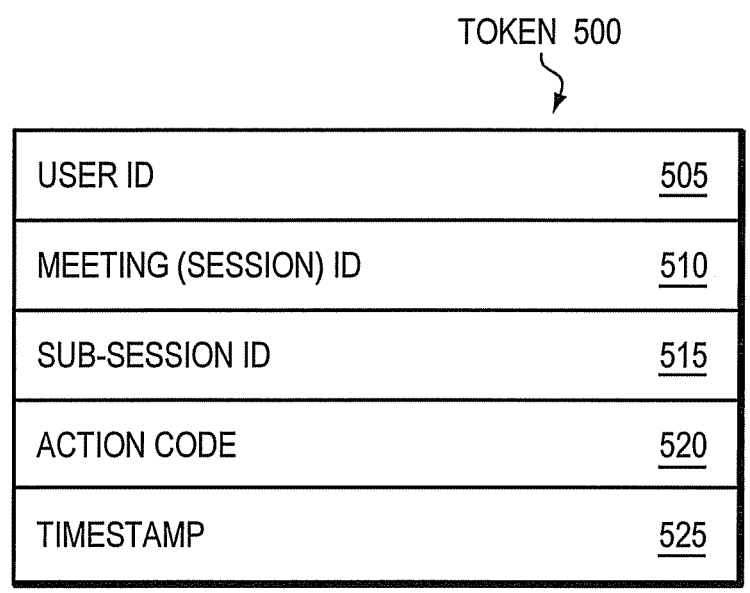
FIG. 5 illustrates an example token/message.

As can be seen, for a client device to participate in a particular sub-session, the client device must obtain a sub-session token (e.g., which may be encrypted) that is used to pass the client device's (user's) privilege information from the corresponding session controller(s) 425 to the collaboration server(s) 440. FIG. 5 illustrates a format of an example token 500 that may be used in accordance with one or more embodiments described herein. For example, the token 500 may comprise a plurality of fields, such as:

User ID/name 505: a unique identifier in a session/meeting that identifies to which device the token 500 is issued;

Meeting ID/Number 510: a universal unique identifier that identifies for which meeting the token is valid;

Sub-Session ID/Name 515: an identifier that identifies which sub-session the client device is permitted to establish;

Action Code 520: an identifier that indicates what action the token bearer may take for the sub-session type in field 515, e.g., starting desktop sharing or joining desktop sharing, etc. (optionally a specific portion of sub-session ID 515 field);

Timestamp 525: optionally used to control the lifespan of the token that the client device can use for a particular sub-session in the collaborative session.

The ticket/token 500 may be either digitally signed by the issuer (session controller 425) with a public key algorithm (e.g., the known RSA algorithm) or encrypted with a symmetric key algorithm (e.g., the known AES or 3DES algorithms). Illustratively, for performance consideration (as may be appreciated by those skilled in the art), a symmetric key-based ticket may be used, where the encryption key is shared between the token issuer (session controller 425) and verifier (collaboration server 440).

Also, as noted, the sub-sessions of the online collaborative computing session may be based on the type of session (e.g., chat, desktop sharing, etc.), or the type and action (e.g., start chat, join chat, etc.). Illustratively, sub-sessions may be chosen from within the following sub-session types or type/action pairs:

a chat sub-session, starting a chat sub-session, or joining a chat sub-session;

a desktop sharing sub-session, starting a desktop sharing sub-session; or joining a desktop sharing sub-session;

a portable document (document sharing) sub-session, starting a portable document sub-session, or joining a portable document sub-session;

a remote access sub-session, starting a remote access sub-session, or joining a remote access sub-session;

a file transfer sub-session, starting a file transfer sub-session, or joining a file transfer sub-session;

a voice over Internet Protocol (VoIP) sub-session, starting a VoIP sub-session, or joining a VoIP sub-session;

a video sub-session, starting a video sub-session, or joining a video sub-session;

etc. (those mentioned herein are examples, and are not meant to limit the scope of the embodiments described herein).

According to one or more of the embodiments herein, multiple aspects of token-based sub-session permission control may be performed, independently or in cooperation, in order to enforce internal and external sub-session policies. For instance, according to one aspect of the embodiments herein, it may be determined and confirmed (authenticated or validated) whether a client device is an internal device or a guest is device, such that internal policies may be enforced. According to another aspect of the embodiments herein, an organization may configure a firewall filter to block the sub-sessions that they do not wish to allow (external policies) by blocking the corresponding network locations (e.g., URLs) so the client device cannot obtain the sub-session tickets/tokens successfully.

As noted, a first aspect of the embodiments herein uses the tokens 500 to assist in distinguishing between internal client devices (those belonging to or otherwise associated with the organization hosting the collaborative computing session) and guest client devices (non-internal or external devices). According to illustrative details of this aspect, invitations to attend a session/meeting may present two participating options for logging into the session: internal participants or guests. Guests are not considered to be internal participants, and may follow standard procedures to join the session as a guest (or may be redirected to sub-session session controllers as described below for use with a firewall in the second aspect of the embodiments herein). Internal participants, on the other hand, may be redirected as described below with reference to FIG. 6A for authentication, such that internal, guest, and internal versus guest policies may be enforced.

Figure 6A:
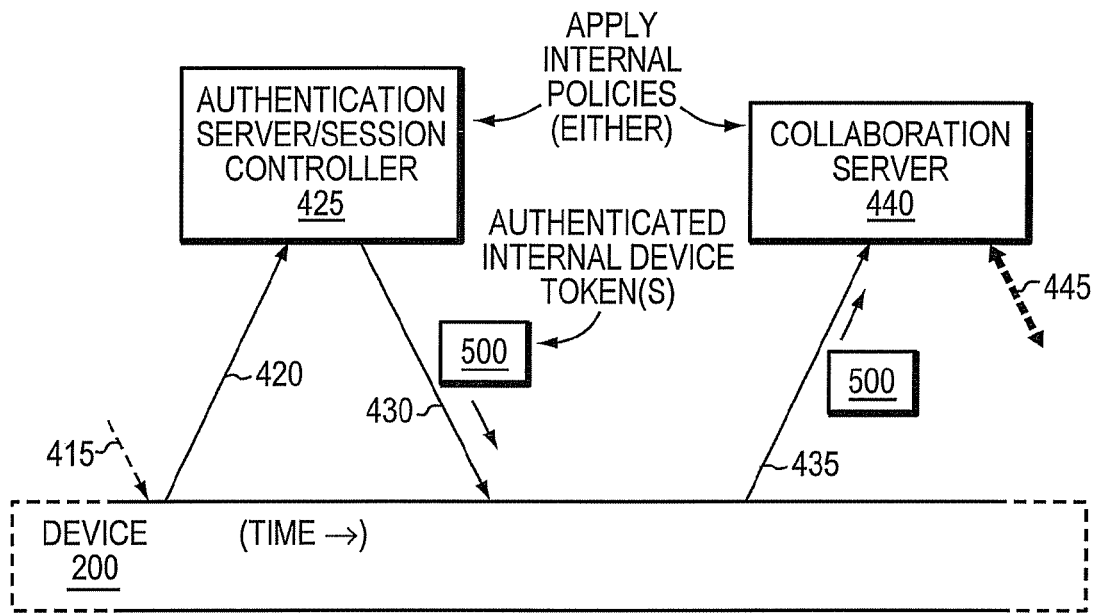
FIG. 6A illustrates an example token control using authentication.

Specifically, FIG. 6A illustrates an alternative view of relevant portions of FIG. 4 in accordance with this first aspect. Assume that an internal participant (e.g., a client device following an internal device link to the session) is redirected by the session service provider (e.g., the meeting/web server 410) to a session controller 425 that is configured to function as an authentication server. For example, a session controller 425 of the service provider may be so configured, or, preferably, the client device may be redirected to an internal authentication server 140 of the organization (e.g., a "session controller" controlled/managed by the organization). In this manner, the internal participant may be authenticated as internal (e.g., through various techniques, such as lookup lists, address tables, user ID and password confirmation, secret codes of the organization known to an external session controller 425, etc., as may be appreciated by those skilled in the art). In return, an authenticated internal participant may be provided with the authentication token 500 to be transmitted to the collaboration server 440 as described above. A non-authenticated (external/guest) participant receives no authentication token, and may be redirected to the guest log in, accordingly.

The authentication token 500 may be populated according to one of two possible embodiments, each of which may be digitally signed for authentication purposes, and, in general, carries enough information to indicate that the client device is an internal device. First, the authentication token may include the internal policies embodied as a list of accessible sub-sessions, or, alternatively, may actually comprise one or more sub-session tokens that indicate each sub-session of the online collaborative computing session in which the client device is permitted to participate. Second, the token may include an organization ID (e.g., instead of sub-session ID field 515) to identify the particular organization for which the client device is authenticated and that is associated with pre-configured policies at the session service provider. In this second embodiment, the single sub-session token may indicate that the client device is associated with the organization, and the collaboration server 440 can thus determine a set of sub-sessions in which the client device associated with the organization is permitted to participate.

(Note that in a third example embodiment, the authentication token may be received from the host organization, and once verified by the session service provider, may be translated to a new token 500 issued from service provider based on the original authentication token and an associated profile (e.g., an ID, policies to obey, meeting ID, etc.) within the original token. This new token may then be sent to the client device so it can present it to the collaboration server to join/start the intended sub-sessions.)

Based on the policies, such as those known to the collaboration server 440 or relayed via the received sub-session token(s), the collaboration session service provider may thus allow the internal participant to establish/utilize the appropriate sub-sessions features, while distinguishing between internal participants and guest participants based on the authentication tokens. In this manner, policies may be defined such that permitted sub-sessions are based on whether the client device is associated with the organization (internal) or is a guest. For instance, policies may be specific to internal/external application, e.g., no document sharing from internal to external client devices, no file transfer for external client devices, no chatting between internal client devices, etc. The key is that as long as the service provider is aware of which devices are internal and external (guests), then it can enforce the proper policy. For example, an internal participant can simply share a document with all participants (whether they are internal or external), but based on the authentication tokens and an example associated internal versus external/guest sub-session policy (control), all external participants may be prevented from viewing the document as the document sharing sub-session is blocked by the service provider servers for external client devices.

According to the second aspect of the embodiments herein, the tokens 500 may be used to provide an effective way for organizations (customers, companies, etc.) to identify sub-sessions of online collaborative computing sessions so that external policies may be enforced by the organizations themselves, such as by configuration of an organization's firewall 150. According to illustrative details of this aspect, each sub-session request 420 is sent to a particular session controller 425 at a corresponding network location, such as, e.g., a uniform resource locator (URL), a network address, a particular network device, etc.

Figure 6B:
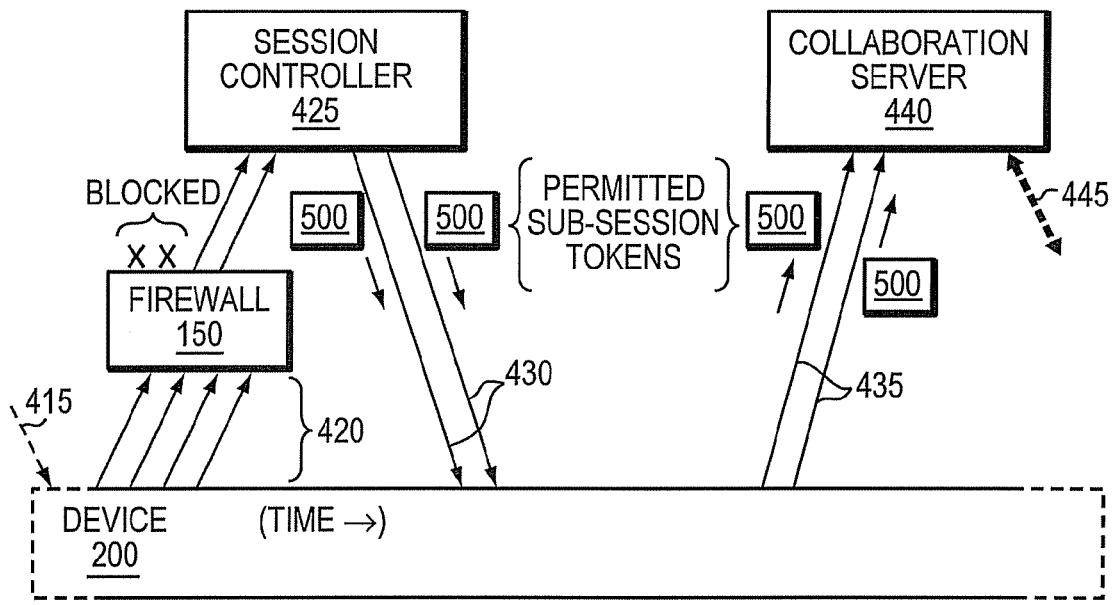
FIG. 6B illustrates an example token control using a firewall.

Specifically, FIG. 6B illustrates an alternative view of relevant portions of FIG. 4 in accordance with this second aspect. In particular, to allow an organization to identify the individual sub-sessions, each sub-session is mapped to a dedicated network location, e.g., URL, which may be known by the organizations that wish to control their external sub-session permissions in this manner. For example, one identifiable URL format may comprise:

"https://[action].[sub-session].  [session  service provider].com"; or

"https://[server].[session service provider].com/[sub-session]/[action]"; etc., where, generally, "[session service provider]" is the home domain name of the session service provider (where ".com" is used as an example), "[session]" is some known format of sub-session identification (e.g., "chat" or "DS" for document sharing, etc.), and "[action]" represents the actions that can be taken for a sub-session (e.g., start, join, etc.). For example, "https://join.DS.[session service provider].com" may be used to reach a session controller 425 responsible for tokens that would permit joining a document is sharing sub-session. It is important to note that these URLs are merely examples, and that any format may be used and distributed. For instance, "[action]" or "[server]" need not be used, other terms or order may be used, etc. (IP addresses may be used, device host names may be used, etc.).

These particular network locations corresponding to the session controllers may be known ahead of time (by the client devices or the organization), or may be learned in response to initiating the online collaborative computing session (e.g., sending an initiation request 405 to a meeting server 410, and, in response, receiving the particular corresponding network locations in message 415 from the meeting server). For instance, the learned network locations for client devices may correspond only to those particular sub-sessions available in the online collaborative computing session. Alternatively, the organization (administrator, management processes, etc.) may learn of the locations through documentation (paper or online), dynamic retrieval (e.g., a program/process that accesses the session service provider's information base), etc. In this manner, the network locations need not be "human-readable" locations, such as URLs, but may be any desired and configurable network location identification (and may thus be updated/changed periodically, e.g., for security).

Based on the known (or learned) network locations for the various sub-session types, a firewall 150 managed by an organization (e.g., organization "A") can be configured to block certain session controllers 425 that correspond to sub-sessions that are to be denied (e.g., as determined by the organization's policies). As such, when sub-session requests 420 are sent for each sub-session type through the firewall to the corresponding session controllers 425 (network locations), the firewall may block those specified network locations from being accessed by client devices within the controlled domain (e.g., 100a and 110b). Notably, while separate session controllers 425 are shown and described, different network locations (e.g., URLs) may be mapped to a single physical session controller, such as a single server configured to service a plurality of different URLs.

In this manner, the received sub-session tokens 500 (in messages 430) are only is those from session controllers at network locations not blocked by the firewall, and thus tokens are received for only those permitted sub-sessions for the organization ("A"). (Note that organization "B" that illustrative has an account with the session service provider may also use this technique, such as defining firewall policies for when internal client devices of organization "B" are attending sessions hosted by other organizations as guests to those sessions, where gateway 160 is also a firewall or a separate firewall is configured.) The client device may then only send the permitted tokens (e.g., individually, or as a consolidated single token) to the collaboration server 440 to establish the permitted sub-sessions.

As an example, blocking https://start.desktop-sharing.[session service provider].com, but not blocking https://join-.desktop-sharing.[session service provider].com would correspondingly allow organization members (e.g., company employees) to join a desktop sharing session, but not initiate one. In other words, in this case, the attendee could use the presenter's desktop but would be unable to share its own desktop to others. As such, this aspect of the embodiments herein defines a policy-based access control (session control) mechanism for applications (e.g., especially for online services) by leveraging existing firewall capability. (Generally, firewalls are designed to block URLs and IP addresses of certain patterns, which is efficient to restrict access to applications and websites, but this alone does not provide sub-session level control as there is no knowledge about the applications' corresponding sub-sessions.)

Figure 7:
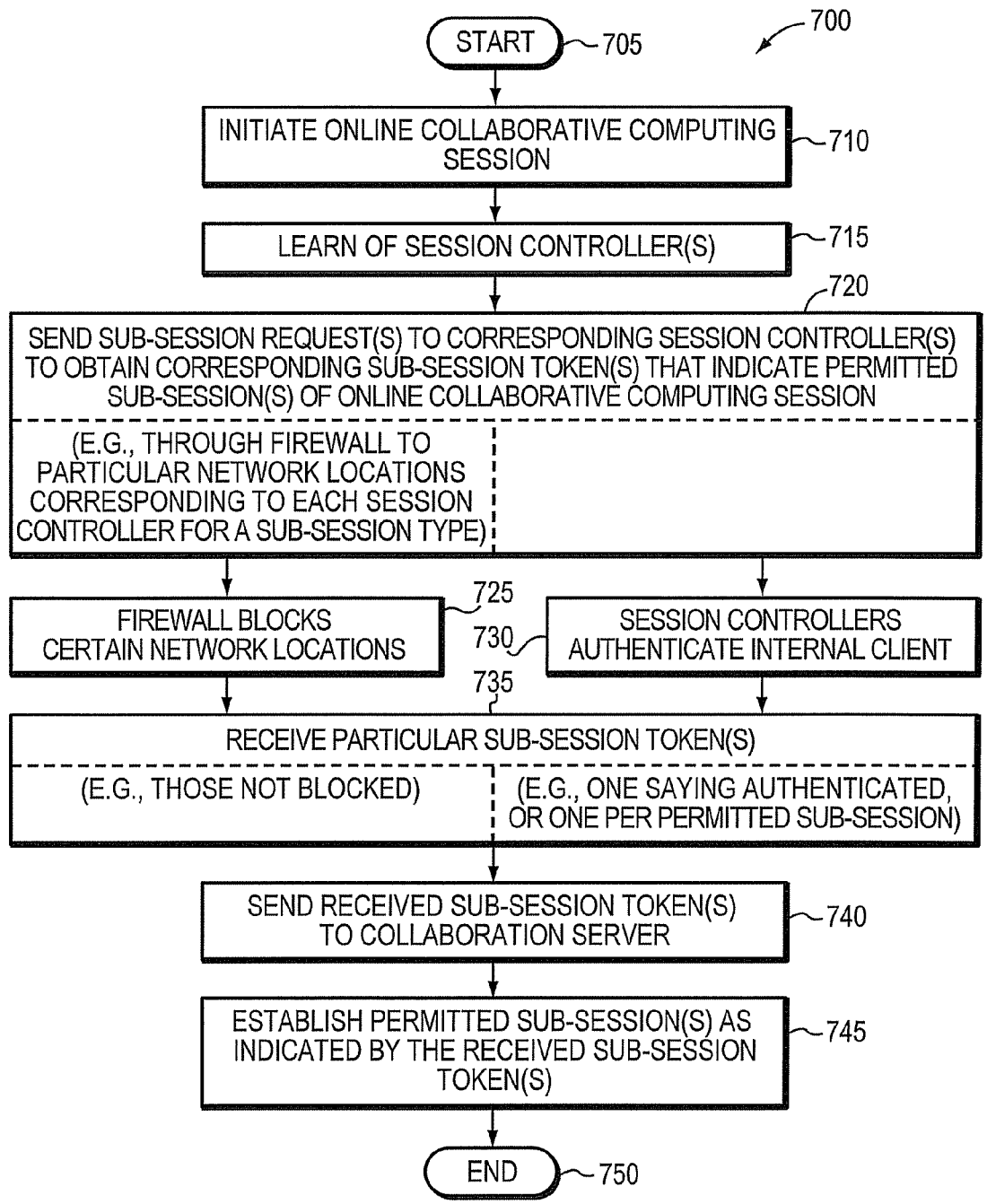
FIG. 7 illustrates an example procedure for token-based control of sub-session permission.

FIG. 7 illustrates a simple example procedure for providing token-based control of permitted sub-sessions for online collaborative computing sessions in accordance with one or more embodiments described herein, e.g., from the perspective of a client device and in accordance with either aspect described above. The procedure 700 starts at step 705, and continues to step 710, where, in certain embodiments, a client device initiates an online collaborative computing session, such as by sending an initiation request 405 to a meeting server 410, which may then inform the client device (via 415) of the relevant session controller(s) for the session (e.g., what sub-sessions/features are available for the session). In step 720, the client device sends one or more sub-session request(s) 420 to the corresponding session controller(s) 425 to obtain corresponding sub-session token(s) that indicate permitted sub-session(s) of online collaborative computing session. For example, the requests 420 may be sent through a firewall 150 to the particular network locations corresponding to each session controller for a sub-session type, which may be blocked in step 725. Alternatively, such as where an internal login is used, the requests 420 may be sent to session controllers that authenticate the internal client (or not) in step 730, e.g., authentication server 140.

In step 735, the client device may receive the particular sub-session token(s) 430/500, which, as described above, may either be those corresponding to sub-sessions of session controllers that are not blocked, a single token indicating authentication, or one or more tokens indicating authentication through permitted sub-sessions. The received sub-session token(s) may then be sent in step 740 (message 435) to the collaboration server 440, which cooperates with the client device in step 745 to establish the permitted sub-session(s) (445) as indicated by the received session token(s). The procedure 700 then ends in step 750, notably with the option to request further tokens at a later time, such as where new sub-sessions are initiated during the course of the online collaborative computing session.

Figure 8:
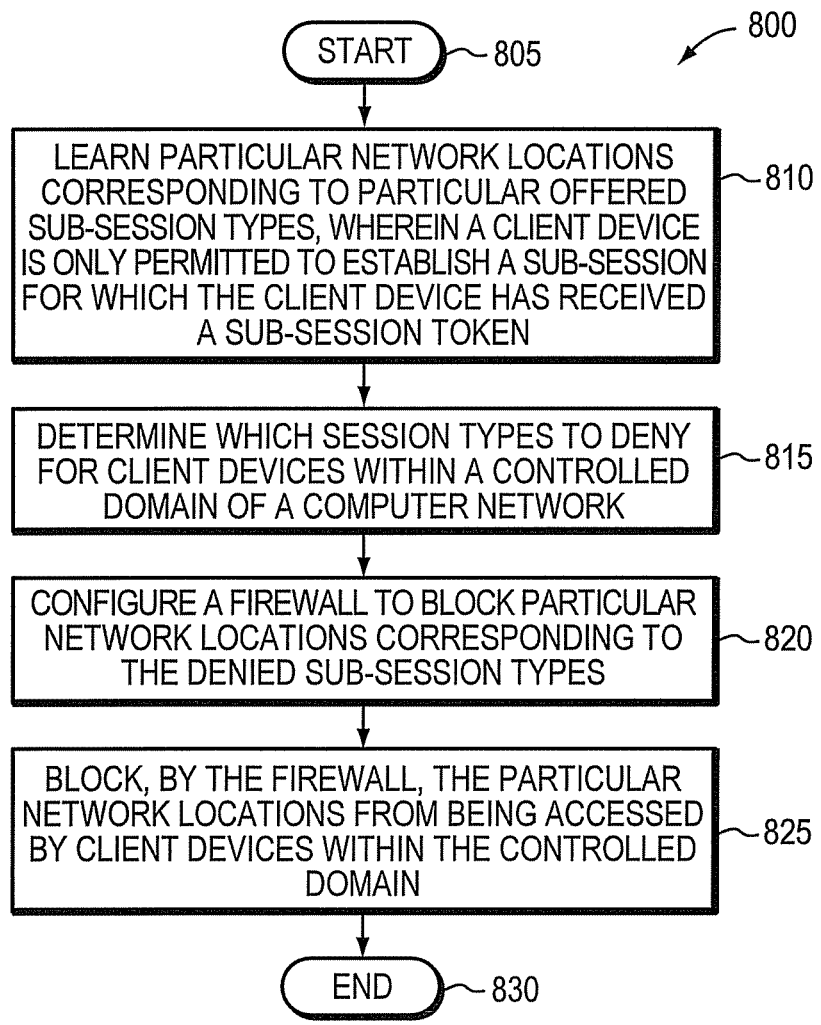
FIG. 8 illustrates another example procedure for token-based control of sub-session permission.

In addition, FIG. 8 illustrates another simple example procedure for providing token-based control of permitted sub-sessions for online collaborative computing sessions in accordance with one or more embodiments described herein, e.g., from the perspective of an organization that wishes to prevent certain sub-session activity according to the second aspect described above. The procedure 800 starts at step 805, and continues to step 810, where particular network locations corresponding to particular offered sub-session types are learned. In step 815, which sub-session types to deny for client devices within a controlled domain may be determined, such as by a system administrator of the controlled domain (e.g., organization/company network). Accordingly, in step 820, a firewall 150 may be configured to block particular network locations corresponding to the denied sub-session types, such that in step 825, the particular network locations may be blocked by the firewall from being accessed by client devices within the controlled domain. The procedure 800 ends in step 830 (notably with the option of configuring additional or fewer blocked locations, learning of new locations, etc.).

Advantageously, the novel techniques described herein provide token-based control of permitted sub-sessions for online collaborative computing sessions. By allowing an organization (e.g., company or managed network) to block certain features of a collaboration session through configuration of a firewall or through location authentication, location-based feature-specific policies may be enforced. Notably, the techniques above are not simply the use of a firewall, but to its use to establish permitted sub-session types through the novel token-based operation as described herein.

In particular, the techniques described above provide a way for companies to enforce their policies for collaboration sessions without having to establish an account with the collaboration session service provider. In particular, by using known network locations (e.g., URLs) for each sub-session (feature) and corresponding sub-session tokens, a company can enforce feature-based policies using a firewall to block selected locations. In addition, the techniques described above provide a way for companies to enforce their internal versus guest policies for collaboration sessions through the token-based authentication (and subsequent sub-session permissions) as described above.

While there have been shown and described illustrative embodiments that provide token-based control of permitted sub-sessions for online collaborative computing sessions, it is to be understood that various other adaptations and modifications may be made within the spirit and scope of the present invention. For example, the embodiments have been shown and described herein for use with online collaborative computing sessions. However, the embodiments of the invention in their broader sense are not so limited, and may, in fact, be used with any relevant online applications, such as software as a service (SaaS) applications that may have sub-sessions or features and related policies. Furthermore, while the certain embodiments above are described with reference to a firewall, other devices capable of blocking network locations may be used, such as HTTP proxies, access control list (ACL) implementing devices, or other such devices that are capable of network location (e.g., URL) inspection logic, as may be appreciated by those skilled in the art (e.g., the techniques may generally be applied through use of lower layer network devices to provide authorization for the upper layer applications).

Illustratively, the techniques described herein may be performed by hardware, software, and/or firmware, such as in accordance with online collaborative computing process 245, which, in addition to conventional functions described above, may contain computer executable instructions executed by the processor 220 to perform functions relating to the novel techniques described herein, e.g., as a client device process.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   sending, from a client device, two or more sub-session requests that are sent to two or more corresponding session controllers through a computer network to respectively obtain two or more corresponding sub-session tokens that indicate in which sub-sessions of the online collaborative computing session the client device is permitted to participate, wherein the client device is associated with an organization, and wherein the session controllers are managed by the organization and permitted sub-sessions being based on whether the client device is associated with the organization or is a guest of the online collaborative computing session;
   receiving particular sub-session tokens of the two or more corresponding sub-session tokens at the client device;
   sending the received sub-session tokens from the client device to a collaboration server; and,
   in response, establishing two or more permitted sub-sessions of the online collaborative computing session with the client device as indicated by the received sub-session tokens.

2. The method as in claim 1, wherein each sub-session request is sent to a particular corresponding network location.

3. The method as in claim 2, wherein the particular network location is selected from a uniform resource locator (URL), a network address, and a particular network device.

4. The method as in claim 2, wherein sending the sub-session requests comprises sending the requests through a firewall, and wherein the received sub-session tokens are only those from session controllers at network locations not blocked by the firewall.

5. The method as in claim 4, wherein the firewall is managed by an organization in which the client device belongs, the organization not having an account for the online collaborative computing session.

6. The method as in claim 2, further comprising:
   learning of each particular corresponding network location.

7. The method as in claim 3, further comprising:
   initiating the online collaborative computing session by sending an initiation request to a meeting server; and, in response,
   receiving the particular corresponding network locations from the meeting server.

8. The method as in claim 7, wherein the particular corresponding network locations received from the meeting server correspond to particular sub-sessions available in the online collaborative computing session.

9. The method as in claim 1, wherein sending the one or more sub-session requests to one or more corresponding session controllers is based on whether the client device is associated with the organization or is a guest of the online collaborative computing session.

10. The method as in claim 1, wherein the session controllers authenticate that the client device is associated with the organization.

11. The method as in claim 1, wherein the one or more sub-session tokens indicate each sub-session of the online collaborative computing session in which the client device is permitted to participate.

12. The method as in claim 1, wherein the one or more sub-session tokens are a single token that indicates that the client device is associated with the organization, and wherein the collaboration server determines a set of sub-sessions of the online collaborative computing session in which the client device associated with the organization is permitted to participate.

13. The method as in claim 1, wherein the sub-sessions of the online collaborative computing session are selected from a group consisting of: starting a chat sub-session; joining a chat sub-session; starting a desktop sharing sub-session; joining a desktop sharing sub-session; starting a portable document sub-session; joining a portable document sub-session; starting a remote access sub-session; joining a remote access sub-session; starting a file transfer sub-session; joining a file transfer sub-session; starting a voice over Internet Protocol (VoIP) sub-session; joining a VoIP sub-session; starting a video sub-session; and joining a video sub-session.

14. An apparatus, comprising:
a network interface adapted to communicate over a computer network;
a processor coupled to the network interfaces and adapted to execute one or more processes; and
a memory adapted to store a process executable by the processor, the process when executed operable to:
send two or more sub-session requests that are sent to two or more corresponding session controllers through the computer network to respectively obtain two or more corresponding sub-session tokens that indicate in which sub-sessions of the online collaborative computing session the client device is permitted to participate, wherein the client device is associated with an organization and the one or more session controllers are managed by the organization and authenticate that the client device is associated with the organization, and permitted sub-sessions based on the client device being associated with the organization or is a guest of the online collaborative computing session;
receive particular sub-session tokens of the two or more corresponding sub-session tokens;
send the received sub-session tokens to a collaboration server; and, in response, two or more permitted sub-sessions of the online collaborative computing session as indicated by the received session tokens.

15. The apparatus as in claim 14, wherein each sub-session request is sent to a particular corresponding network location through a firewall, and wherein the received sub-session tokens are only those from session controllers at network locations not blocked by the firewall.

16. The apparatus as in claim 14, wherein the one or more sub-session tokens indicate one of either:
i) each sub-session of the online collaborative computing session in which the client device is permitted to participate; or
ii) that the client device is associated with the organization, and wherein the collaboration server determines a set of sub-sessions of the online collaborative computing session in which the client device associated with the organization is permitted to participate.

17. A tangible computer-readable medium having software encoded thereon, the software when executed to:
send, from a client device, two or more sub-session requests to two or more corresponding session controllers through a computer network to respectively obtain two or more corresponding sub-session tokens that indicate in which sub-sessions of the online collaborative computing session the client device is permitted to participate, wherein the client device is associated with an organization and wherein the session controllers are managed by the organization, and permitted sub-sessions are based on whether the client device is associated with the organization or is a guest of the online collaborative computing session;
receive particular sub-session tokens of the two or more corresponding sub-session tokens;
send the received sub-session tokens to a collaboration server; and, in response,
establish two or more permitted sub-sessions of the online collaborative computing session as indicated by the received sub-session tokens.

\* \* \* \* \*